(No Model.)
M. J. RIBYN, Jr.
SPROCKET WHEEL AND CHAIN.
No. 590,649. Patented Sept. 28, 1897.
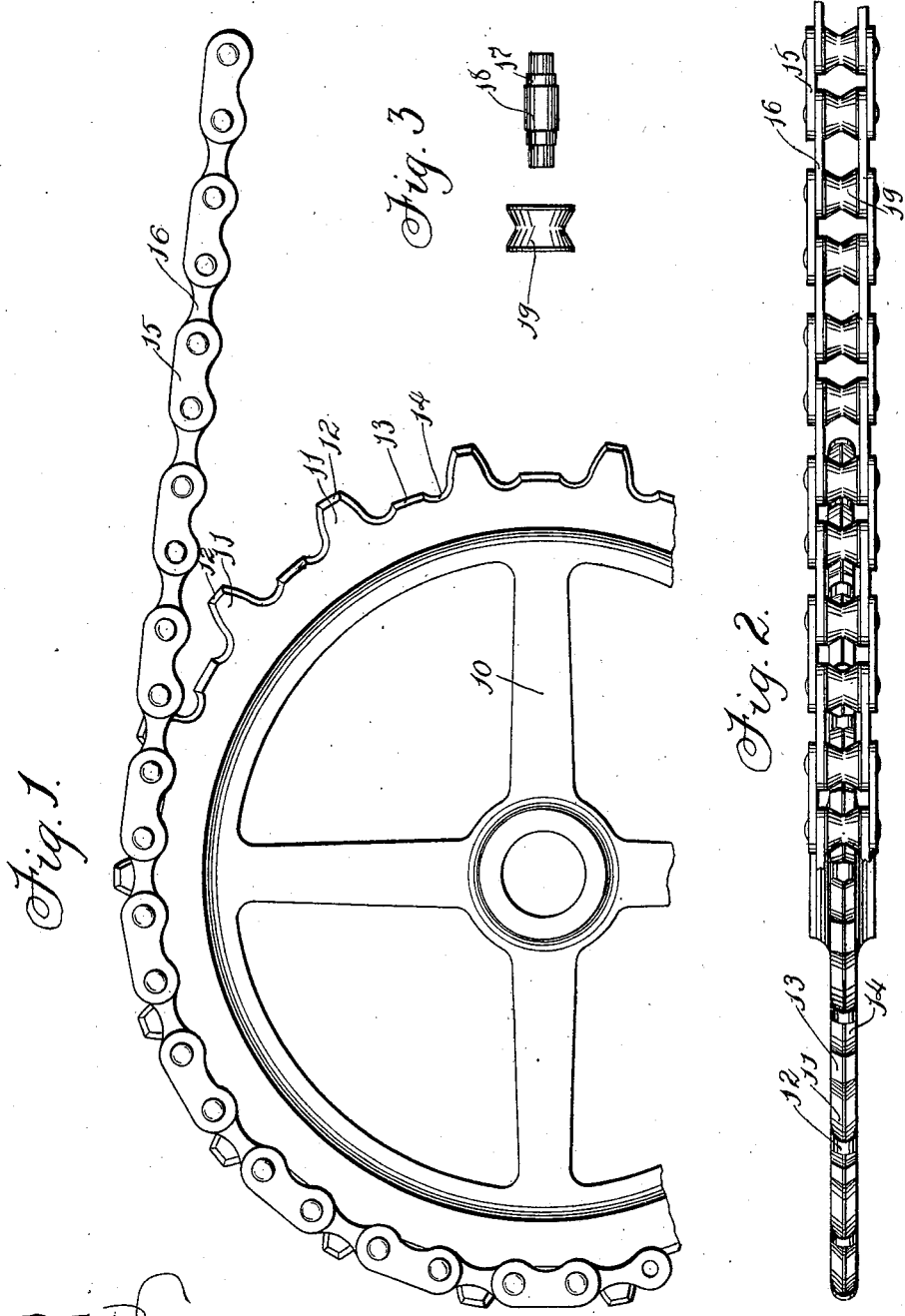

UNITED STATES PATENT OFFICE.

MATHIAS J. RIBYN, JR., OF KEOKUK, IOWA.

SPROCKET WHEEL AND CHAIN.

SPECIFICATION forming part of Letters Patent No. 590,649, dated September 28, 1897.

Application filed March 22, 1897. Serial No. 628,748. (No model.)

*To all whom it may concern:*

Be it known that I, MATHIAS J. RIBYN, Jr., a citizen of the United States, residing at Keokuk, in the county of Lee and State of Iowa, have invented a new and useful Sprocket Wheel and Chain, of which the following is a specification.

The object of this invention is first to provide a sprocket chain and wheel in which the chain-links will fit the sprocket-wheel accurately at all points, so that no part of the chain may slide upon any part of the wheel at any time. Rollers on the connecting-rivets of the links prevent the same from sliding on the teeth during their epicycloidal movement when they are engaged with and disengaged from the teeth.

It is the object, more specifically, of this invention to provide a sprocket wheel and chain in which the wearing away of the contacting surfaces will not prevent the chain from accurately fitting the sprocket.

A further object is to provide a sprocket-gearing in which the chain is accurately held to the central line of the wheel, so that the teeth may not engage the said links and so that there can be no lateral movement of the chain on the sprocket-wheel.

A further object is to provide a sprocket-gearing in which friction is reduced to a minimum and in which the unavoidable wear is distributed through a comparatively great bearing-surface.

My invention consists in certain details in the construction of the chain and in the formation of the sprocket-wheel and in the combination of this particular chain and sprocket, as hereinafter set forth, pointed out in my claim, and illustrated in the accompanying drawings, in which—

Figure 1 shows a side elevation of a portion of a sprocket-wheel and a chain mounted thereon embodying my invention. Fig. 2 shows a top or plan view of the same parts illustrated in Fig. 1. Fig. 3 shows an enlarged detail view of one of the chain-rollers and one of the connecting-rivets therefor.

Referring to the accompanying drawings, I shall first describe the construction of the sprocket-wheel. The general contour of the teeth is identical with that form of sprocket-wheel commonly known as the "cycloidal" sprocket—that is, one in which the bearing-surface of each tooth is composed of a compound curve, the upper part being an epicycloidal and the lower part a hypocycloidal. In addition to this the bearing-surfaces of the teeth are convex.

The reference-numeral 10 is used to indicate the sprocket-wheel proper.

11 indicates the teeth, and 12 the convex surfaces of the teeth.

At 13 the interdental projections of the sprocket-wheel are shown to be concentric with the rim. The essentially novel feature in the construction of the sprocket consists in providing at each side of the base of each tooth a segmental transverse groove 14. It will be seen by referring to the accompanying drawings that the convex surface of the teeth is continued throughout the segmental transverse groove 14 and the interdental space 13.

The general construction of the chain is of the class commonly known as "roller-chain," and is composed of connecting-links 15 and 16, the links 15 being somewhat shorter than the others. The links are connected by rivets. These rivets differ from the ordinary rivets in that a shoulder 17 is formed on each end thereof, and the central portion thereof, 18, is of larger diameter than the shoulder 17. This is so made and arranged that the inner links 16 will not bind upon the ends of the rollers and the outer links 15 will not bind against the inner links when the rivets have been headed. The roller 19 is provided with a concave surface, and this concave is made to accurately fit the convex surface of the teeth. The chain is so proportioned relative to the sprocket-wheel that when placed upon the sprocket-wheel the teeth will project through the rollers that are connected by the links 16, and the rollers that are connected by the links 15 will accurately fit into the transverse segmental grooves that lie between the teeth.

In practical operation it will be noted that the two rollers connected by the links 15 will engage the adjacent bearing-surfaces of two teeth. Heretofore the rollers or blocks of chains have been so arranged that the roller or the end of the bearing-block that is in advance relative to the line of travel will engage the bearing-surfaces of the tooth and all of the friction and wear to which the sprocket-wheel is subjected will be applied at that point, but by reason of the peculiar construction of my sprocket-wheel the said rollers will lie in the segmental transverse grooves. The forward roller will of course engage the bearing-surface of the spocket-tooth, as heretofore described, and the other roller will lie in the remaining segmental transverse groove. This will cause the rear roller to engage the bearing-surface of the adjacent tooth and also the entire bearing-surface of the groove, and hence the bearing-surface between the two sprocket-teeth will be distributed evenly throughout this entire surface and will not fall entirely upon the sprocket-tooth. Hence as the wear upon the entire surface is substantially uniform the chain will accurately fit the sprocket-wheel even when the wheel has become considerably worn. The convex and concave surfaces on the sprocket-wheel and rollers will obviously hold the chain to the exact center of the sprocket-wheel and lateral movements of the sprocket-chain relative to the wheel will be prevented.

Having thus described my invention, what I claim as new therein, and desire to secure by Letters Patent of the United States therefor, is—

A sprocket-gearing, comprising a wheel having cycloidal teeth, and a segmental transverse groove at each side of every tooth, and also having the entire periphery of the wheel, the grooves, and the teeth tapered outwardly along a central line, and a roller-chain having two rollers to enter each of interdental spaces of the sprocket-wheel, and also having each roller concaved to accurately fit the surface of the sprocket-wheel, said rollers being arranged to lie in the segmental transverse grooves, all arranged and combined substantially in the manner set forth and for the purposes stated.

MATHIAS J. RIBYN, JR.

Witnesses:
J. A. BRAMHALL,
THOMAS G. ORWIG.